(12) United States Patent
Ikuno

(10) Patent No.: US 11,623,480 B2
(45) Date of Patent: Apr. 11, 2023

(54) TIRE

(71) Applicant: TOYO TIRE Corporation, Itami (JP)

(72) Inventor: Yusuke Ikuno, Itami (JP)

(73) Assignee: TOYO TIRE CORPORATION, Itami (JP)

(*) Notice: Subject to any disclaimer, the term of this patent is extended or adjusted under 35 U.S.C. 154(b) by 27 days.

(21) Appl. No.: 17/317,026

(22) Filed: May 11, 2021

(65) Prior Publication Data

US 2022/0176751 A1    Jun. 9, 2022

(30) Foreign Application Priority Data

Dec. 3, 2020   (JP) .............................. JP2020-201009

(51) Int. Cl.
*B60C 13/02* (2006.01)
*B60C 11/01* (2006.01)

(52) U.S. Cl.
CPC .............. *B60C 13/02* (2013.01); *B60C 11/01* (2013.01)

(58) Field of Classification Search
CPC .............................. B60C 13/001; B60C 13/02
See application file for complete search history.

(56) References Cited

U.S. PATENT DOCUMENTS

2019/0111738 A1* 4/2019 Katayama ............... B60C 13/02
2019/0299719 A1* 10/2019 Murata .................... B60C 11/03

FOREIGN PATENT DOCUMENTS

JP       2016-55820 A      4/2016
JP       2019-73119 A      5/2019

* cited by examiner

*Primary Examiner* — Robert C Dye
(74) *Attorney, Agent, or Firm* — WHDA, LLP

(57) ABSTRACT

The tire is provided which has secured a traction performance in the side surface of the tire while showing a cut resistance property on the side surface of the tire. The tire includes a side block arranged on a side surface of the tire. The side block includes: a first block 11 formed on the side surface, the first block protruded from a tire surface 5 at a first height; a second block 12 formed on the side surface, the second block protruded from the tire surface at a second height different from the first height; a third block 13 formed on the side surface, the third block protruded from the tire surface at a third height different from the second height; and a fourth block 14 formed on the side surface, the fourth block protruded from the tire surface at a fourth height different from the third height.

16 Claims, 10 Drawing Sheets

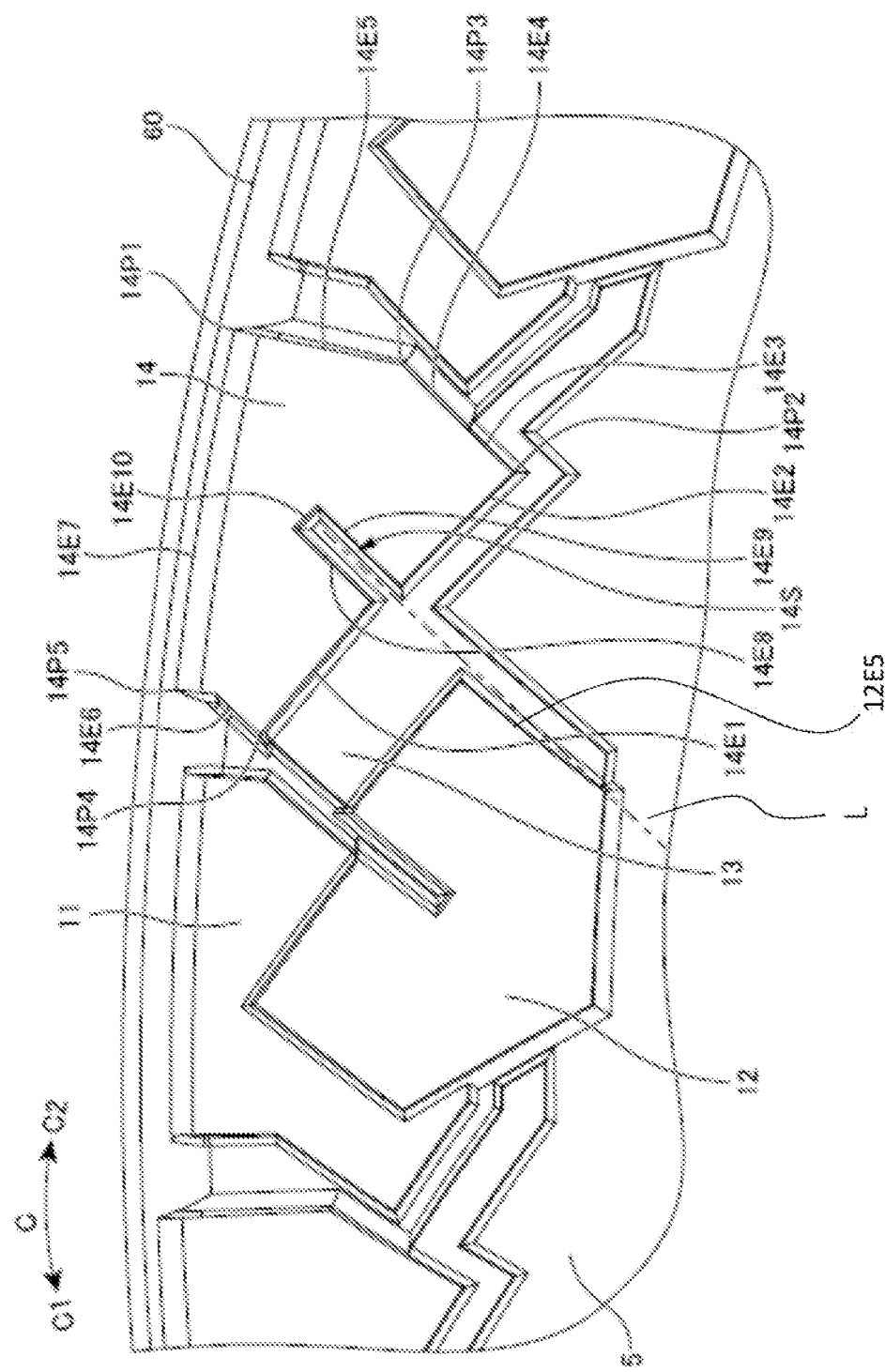

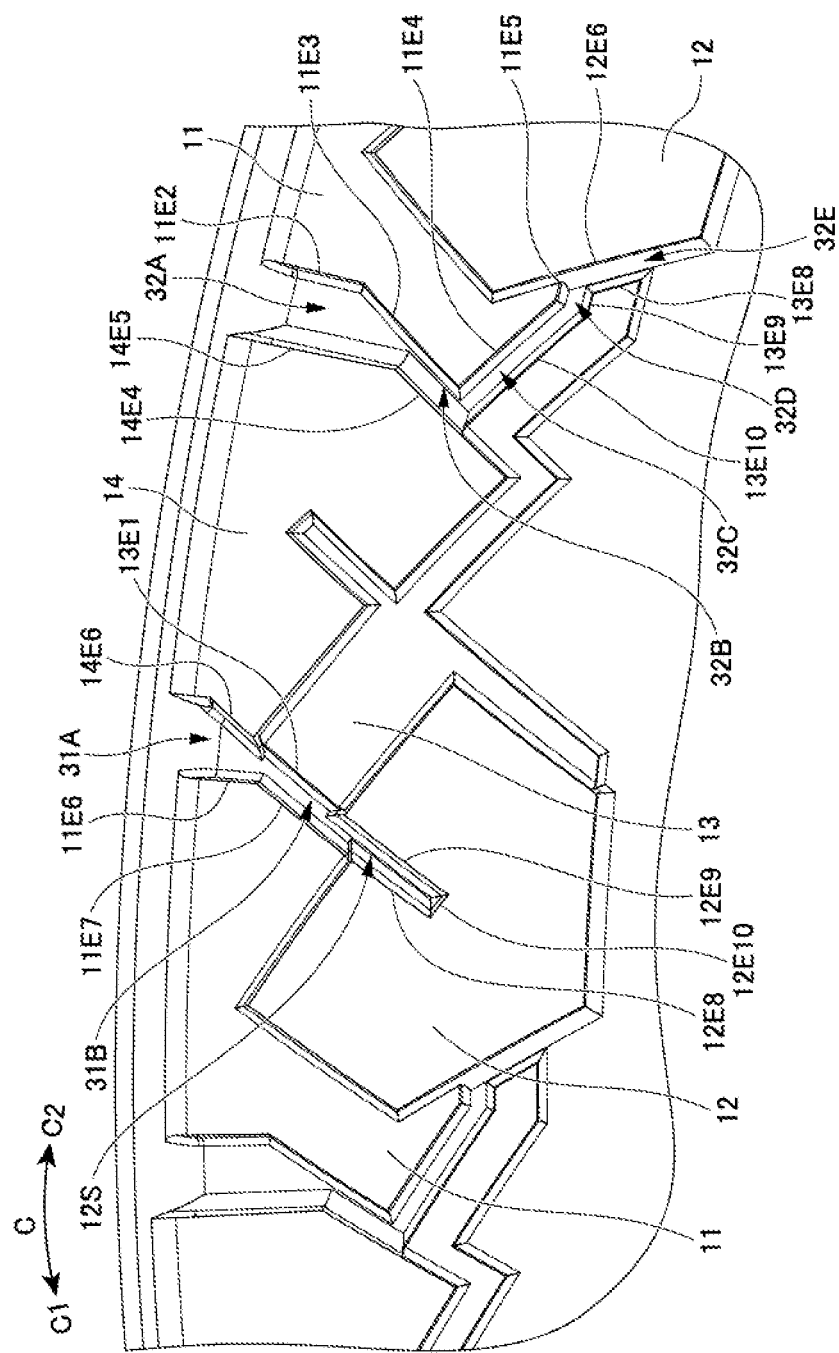

TIRE

TECHNICAL FIELD

The present invention relates to a tire.

BACKGROUND ART

Conventionally, some of known tires have a side block provided on the side surface of the tire. For example, Patent Reference No. 1 discloses a tire having a protruded part as a side block provided on the buttress surface of the side wall part of the tire.

BACKGROUND ART REFERENCES

Patent References

Patent Reference No. 1: Japanese Laid-Open Patent Publication No. 2016-55820

SUMMARY OF THE INVENTION

The Objectives to Solve by the Invention

By being provided with the protruded part, the tire disclosed in Patent Reference No. 1 can show a traction performance at the side surface of the tire on rough roads. Meanwhile, in the drive on rough roads, it is demanded to improve a cut resistance property on the side wall, as well. Since the tire of Patent Reference No. 1 has plural protruded parts separately provided, further improvement of the cut resistance property is demanded.

The present invention was accomplished in view of the objectives as mentioned above, and its purpose is to provide a tire in which a traction performance at the side surface of the tire is secured while obtaining a cut resistance property on the side surface of the tire.

Means to Solve the Objectives

The tire of the present invention comprises a tire having a tire circumferential direction and a tire radial direction, the tire comprising a plurality of side block groups arranged on a side surface of the tire. A plurality of the side block groups includes a first side block group including: a first block protruded from a tire surface; a second block protruded from the tire surface, the second block continued from the first block; a third block protruded from the tire surface, the third block continued from the second block; and a fourth block protruded from the tire surface, the fourth block continued from the third block. The first block is aligned with the third block in the tire circumferential direction via a groove extending therebetween, the groove extending in the tire radial direction. At least a part of the first block and at least a part of the fourth block are located at an outside of the tire radial direction with respect to the second block.

Effects of the Invention

According to the present invention, it is possible to provide a tire in which a traction performance at the side surface of the tire is secured while obtaining a cut resistance property on the side surface of the tire.

BRIEF DESCRIPTION OF THE DRAWINGS

FIG. 4D is an enlarged view for explaining the fourth block of the embodiment of FIG. 1.

FIG. 4E is an enlarged view for explaining the grooves formed on the side block of the embodiment of FIG. 1.

EMBODIMENTS TO CARRY OUT THE INVENTION

Figure 1:
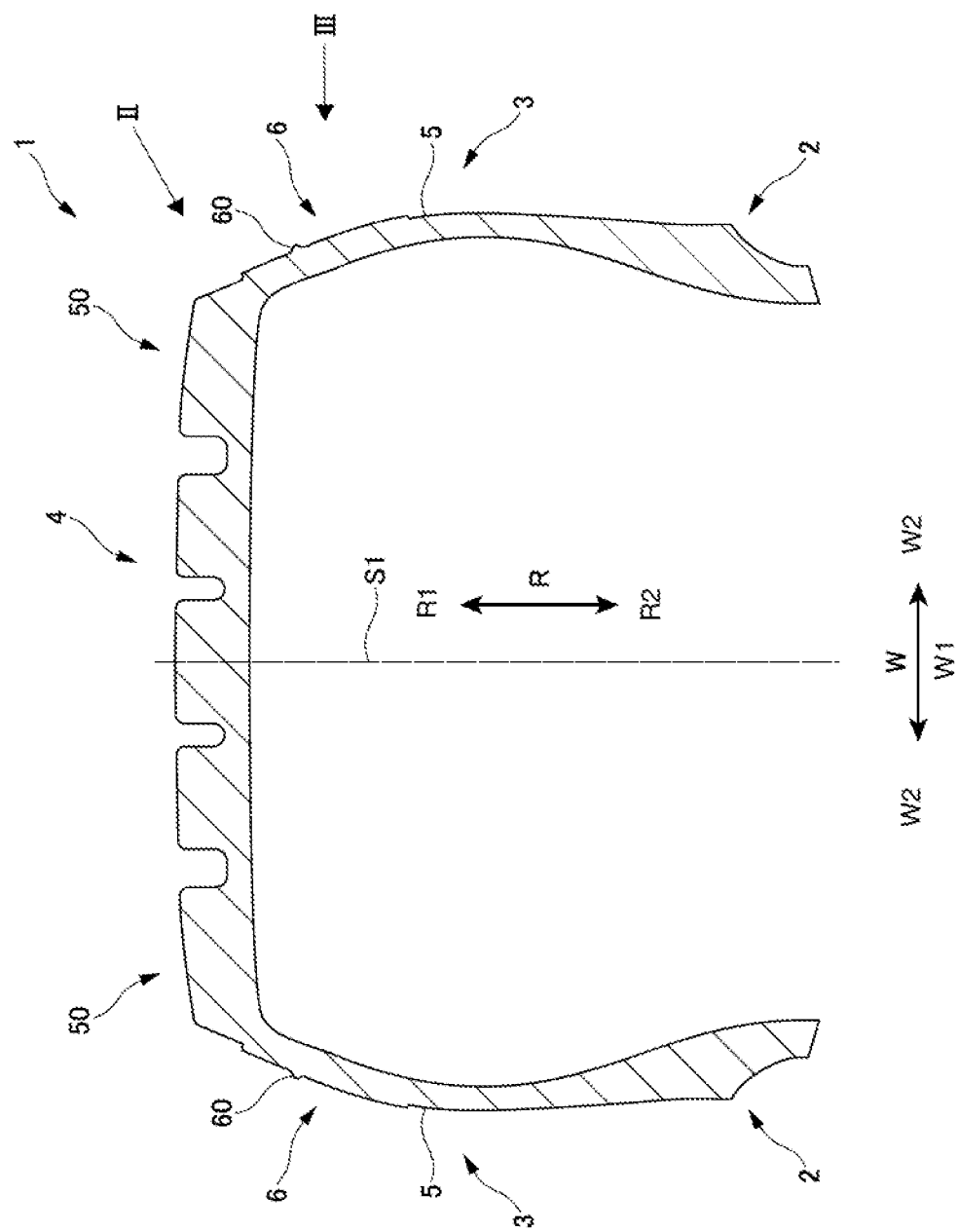
FIG. 1 is a cross sectional view in the tire width direction of the tire of an embodiment of the present application.

Next, an embodiment of the disclosure of the present application is explained with reference to the drawings. FIG. 1 is a cross sectional in the tire width direction of the tire 1 of the embodiment of the present application. In the drawing, the reference S1 corresponds to the tire equatorial plane. The tire equatorial plane S1 is a plane perpendicularly crossing the tire rotation axis (or the tire meridian) and which is located in the center of the tire width direction.

Here, the tire width direction corresponds to the direction parallel to the tire rotation axis. FIG. 1 shows the tire width direction W. Also, an inside of the tire width direction W corresponds to the direction coming close to the tire equatorial plane S1, which is shown as a reference character W1 in FIG. 1. Also, an outside of the tire width direction W corresponds to the direction going away from the tire equatorial plane S1, which is shown as a reference character W2 in FIG. 1. Also, the tire radial direction corresponds to a direction perpendicular to the tire rotation axis. The tire radial direction is shown as the reference character R in FIG. 1. Also, an outside of the tire radial direction R corresponds to the direction going away from the tire rotation axis, which is shown as a reference character R1. Also, an inside of the tire radial direction R corresponds to the direction coming close to the tire rotation axis, which is shown as a reference character R2.

Also, the cross section of the FIG. 1 is shown as a cross section of the tire width direction at a free load condition in which the tire is attached to a regulation rim and filled with a regulation internal pressure (the cross section including the tire meridian). In addition, the regulation rim corresponds to a standard rim that is defined by the JATMA, depending on a tire size. The regulation internal pressure is 180 kPa for a passenger car, for example.

The tire 1 of this embodiment has: a pair of beads 2 formed in the both sides of the tire width direction; a side wall 3 extending at the outside of the tire radial direction of each of the beads 2; and an annular tread 4 extending in the circumferential direction of the tire, which is extended at the outside of the tire radial direction of each side wall 3, and which becomes a tread surface that is a contact surface to the road surface.

Figure 2:
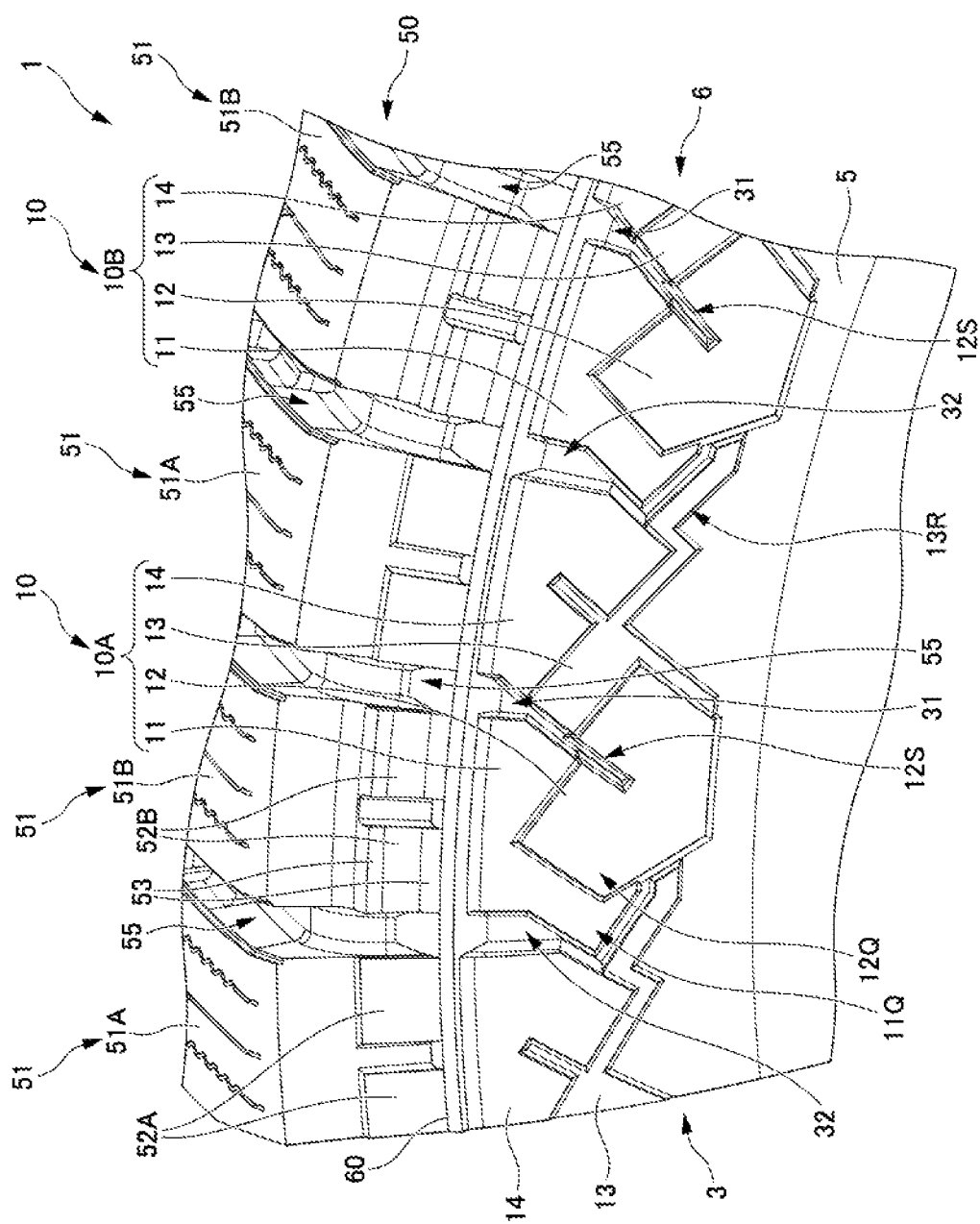
FIG. 2 is a partial perspective view seeing the side surface of the tire from a diagonal direction along the arrow II of the tire 1 of FIG. 1.

FIG. 2 is a partial perspective view of the side surface of the tire seen from an outside position of the tire width direction along the arrow II of the tire 1 of FIG. 1, and illustrates the side surface of the tire 1, or the tire surface 5 of the side wall 3, seen diagonally from the outside position of the tire width direction and of the tire radial direction.

The side wall 3 has a side block 6. The side block 6 is formed as a protrusion from the tire surface 5 of the side wall 3.

The side block 6 includes a first block 11, a second block 12, a third block 13 and a fourth block 14. In addition, the first block 11, the second block 12, the third block 13 and the fourth block 14 form a side block group 10. The constitutions of the first block 11 to the fourth block 14, constituting the side block group, are later explained in detail.

Figure 3:
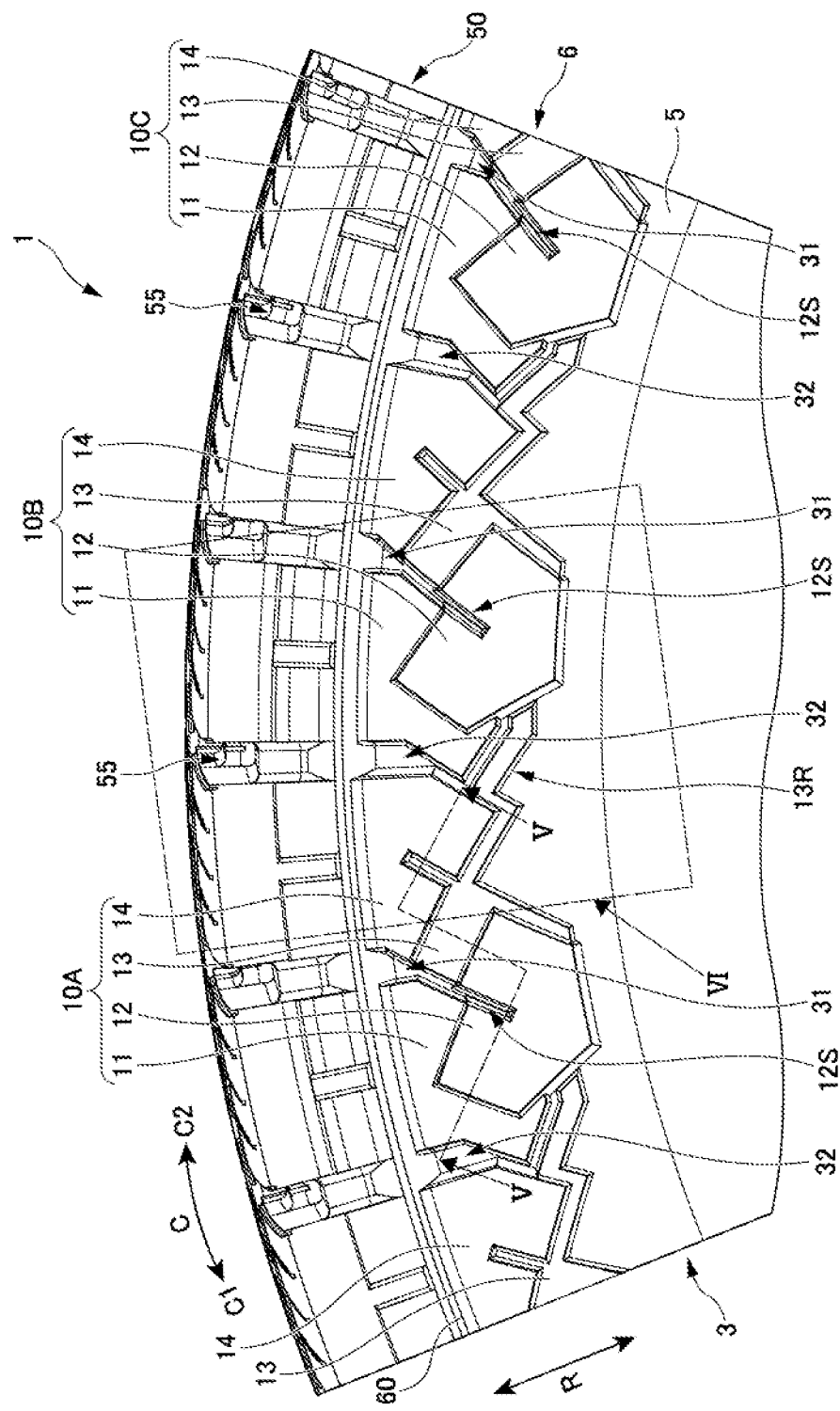
FIG. 3 is a partial perspective view seeing the side surface of the tire from an outside in the tire width direction along the arrow III of the tire 1 of FIG. 1.

FIG. 3 is a partial perspective view from an outside position of the tire width direction along the arrow III of the tire 1 of FIG. 1, and illustrates the side surface of the tire 1, or the tire surface 5 of the side wall 3.

The side block 6 is comprised of a plurality of side block groups 10. As shown in FIG. 3, a plurality of the side block groups 10 are disposed on the tire surface 5 of the side wall 3 with a space with each other in the tire circumferential direction C. As a plurality of the side block groups 10, FIG. 3 shows a first side block group 10A, a second side block group 10B, and a part of a third side block group 10C. Each of the first side block group 10A, the second side block group 10B, and the third side block group 10C has the first block 11, the second block 12, the third block 13 and the fourth block 14. A plurality of the side block groups 10 are disposed on the tire surface 5 of the side wall 3 to be aligned one round along the tire circumferential direction C.

As shown in FIG. 1, a shoulder part 50 is formed at the outside of the tire width direction outside of the tread 4. FIG. 2 and FIG. 3 show a part of the shoulder part 50. The shoulder part 50 has a plurality of shoulder blocks 51. A plurality of the shoulder blocks 51 are formed by dividing the shoulder part 50 by a plurality of shoulder grooves 55 formed with a predetermined interval in the tire circumferential direction C. The plurality of the shoulder blocks 51 include a first shoulder block 51A and a second shoulder block 51B. The first shoulder block 51A and the second shoulder block 51B are alternately placed in the tire circumferential direction C. The first shoulder block 51A has two first projected plane parts 52A projected at the outside of the tire width direction. The two first projected plane parts 52A are aligned with a space in the tire circumferential direction C. The second shoulder block 51B has two second projected plane parts 52B projected at the outside of the tire width direction. The two second projected plane parts 52B are aligned with a space in the tire circumferential direction C. In addition, the second projected plane part 52B has a shape slightly different from that of the first projected plane part 52A, such that a projected place of the second projected plane part 52B at the outside of the tire radial direction and the inside of the tire radial direction has slopes 53, each protruded toward the outside of the tire width direction. In addition, while the shape of the first shoulder block 51A is different from that of the second shoulder block 51B in this embodiment, the first shoulder block 51A and second shoulder block 51B can be provided with the same shape.

At the boundary between the shoulder part 50 and the sidewall 3, a ridge 60 is formed to extend in the tire circumferential direction C. The ridge 60 has a ridge line extending in the tire circumferential direction C. The ridge 60 is a protrusion having a substantially triangular cross section, which is tapered toward the ridge line at the outside of the tire width direction. The ridge 60 can be formed by a mold split position (a parting line) between a mold for molding the tread 4 and a mold for molding the sidewall 3.

Next, the details of the first block 11, the second block 12, the third block 13 and the fourth block 14, constituting the side block group 10, are explained with reference to FIG. 4A to FIG. 4E, FIG. 5 and FIG. 6. The first block 11, the second block 12, the third block 13, and the fourth block 14, which constitute one side block group 10, are continuously formed along the tire circumferential direction C. In the present embodiment, the first block 11, the second block 12, the third block 13, and the fourth block 14, which constitute one side block group 10, are integrally formed in a state of being connected without a gap. Also, the first block 11 is aligned with the third block 13 in the tire circumferential direction C via a groove 31 extending therebetween, the groove extending in the tire radial direction R. In addition, at least a part of the first block 11 and at least a part of the fourth block 14 are located at an outside of the tire radial direction with respect to the second block 12.

The first block 11 is provided to rise from the tire surface 5 of the sidewall 3 at a raised height H1. The second block 12 is continuous with the first block 11 in the tire circumferential direction C and is provided to rise from the tire surface 5 at a raised height H2 which is different from that of the first block 11. The third block 13 is continuous with the second block 12 in the tire circumferential direction C and is provided so as to rise from the tire surface 5 at a raised height H3 which is different from that of the second block 12. The fourth block 14 is continuous with the third block 13 in the tire circumferential direction C and is provided to rise from the tire surface 5 at a raised height H4 which is different from that of the third block 13.

In the present embodiment, the raised height H1 from the tire surface 5 of the first block 11 and the raised height H3 from the tire surface 5 of the third block 13 are lower than the raised height H2 from the tire surface 5 of the second block 12 and the raised height H4 from the tire surface 5 of the fourth block 14. For example, the raised height H1 and the raised height H3 are about 1 mm, whereas the raised height H2 and the raised height H4 are about 2 mm.

First, the shape of the first block 11 is described with reference to FIG. 4A. As described above, the first block 11 is provided so as to rise from the tire surface 5 of the sidewall 3 at a raised height H1. In the following description, the counterclockwise direction of the tire circumferential direction C is defined as the first circumferential direction C1. The clockwise direction of the tire circumferential direction C is defined as the second circumferential direction C2.

The first block 11 has a first outer edge 11E1 as an outer edge at the outside of the tire radial direction thereof. The first outer edge 11E1 extends in the tire circumferential direction. The first outer edge 11E1 serves as a boundary with the ridge 60 arranged at the outside of the tire radial direction of the first block 11. In the present embodiment, the first outer edge 11E1 is connected to the ridge 60. The first outer edge 11E1 of the first block 11 constitutes the outer edge of the side block group 10 at the outside of the tire radial direction.

The first block 11 has a second outer edge 11E2 to a seventh outer edge 11E7 as outer edges that are protruded from the tire surface 5 to form a boundary with the tire surface 5. The outer edge formed by rising from the surrounding can constitute a wall rising from the surrounding.

The second outer edge 11E2 of the first block 11 extends from the first apex 11P1, that is an end point of the first outer edge 11E1 in the first circumferential direction C1, to the inside of the tire radial direction. The angle formed by the first outer edge 11E1 and the second outer edge 11E2 is substantially a right angle.

The third outer edge 11E3 of the first block 11 extends from the second apex 11P2, that is the inner end of the second outer edge 11E2 in the tire radial direction, to the first circumferential direction C1 in an inclined manner toward the inside of the tire radial direction.

The fourth outer edge 11E4 of the first block 11 extends from the third apex 11P3, that is the inner end of the third outer edge 11E3 in the tire radial direction, to the second circumferential direction C2 in an inclined manner toward the inside of the tire radial direction.

The fifth outer edge 11E5 of the first block 11 extends from the fourth apex 11P4, that is the inner end of the fourth outer edge 11E4 in the tire radial direction, to the second circumferential direction C2. As shown in FIG. 4A, the angle formed by the fifth outer edge 11E5 and the tire circumferential direction C is smaller than the angle formed by the fourth outer edge 11E4 and the tire circumferential direction C. The direction in which the fifth outer edge 11E5 can extend substantially coincide with the second circumferential direction C2, but it can be slightly inclined toward the inside of the tire radial direction as shown in FIG. 4A.

The sixth outer edge 11E6 of the first block 11 extends from the fifth apex 11P5, that is an end point of the first outer edge 11E1 in the second circumferential direction C2, to the inside of the tire radial direction. The angle formed by the first outer edge 11E1 and the sixth outer edge 11E6 is substantially a right angle. The sixth outer edge 11E6 is substantially parallel to the second outer edge 11E2.

The seventh outer edge 11E7 of the first block 11 extends from the sixth apex 11P6, that is the inner end of the sixth outer edge 11E6 in the tire radial direction, to the first circumferential direction C1 in an inclined manner toward the inside of the tire radial direction. The seventh outer edge 11E7 is substantially parallel to the third outer edge 11E3. The seventh outer edge 11E7 connects the sixth apex 11P6 to the seventh apex 11P7, that is the inner end of the tire radial direction of the seventh outer edge 11E7.

In addition, the first block 11 further has a boundary with the second block 12, which will be described later.

Here, the third outer edge 11E3 and the fourth outer edge 11E4 form a first corner part 11Q. The first corner portion 11Q is arranged at an end point of the first block 11 toward the first circumferential direction C1. The first corner portion 11Q is formed to rise from the tire surface 5. The first corner portion 11Q has a shape that tapers toward the first circumferential direction C1 in a plan view. The first corner portion 11Q is a corner part having an intersection between the third outer edge 11E3 and the fourth outer edge 11E4, where the third apex 11P3 is formed as an apex. The angle α1 of the first corner portion 11Q, or the angle α1 formed between the third outer edge 11E3 and the fourth outer edge 11E4, is preferably 90 degrees or less. The angle α1 of the first corner portion 11Q is more preferably an acute angle. As a result, an effect of squeezing and discharging the mud and the like on rough roads can be enhanced. In addition, the second corner portion 12Q is located between the first corner portion 11Q and the third corner portion 11P4 of the first block in the clockwise or counterclockwise tire circumferential direction, and the third corner portion 11P4 is located at an inside of the tire radial direction of the second corner portion 12Q.

Next, the shape of the second block 12 is described with reference to FIG. 4B. As described before, the second block 12 is continuous with the first block 11 in the tire circumferential direction C and is provided to rise at a raised height H2 which is different from that of the first block 11. In the present embodiment, the raised height H2 of the second block 12 is higher than the raised height H1 of the first block 11. Also, the raised height H2 of the second block 12 is higher than the raised height H3 of the third block 13.

The second block 12 looks like substantially a pentagon in a plan view. More specifically, the second block 12 has a shape in which the base of a triangle is connected to one side of a rectangle, so as to look like substantially a pentagon like a so-called home base.

The second block 12 has a first apex 12P1 at the inside of the tire radial direction thereof. When the second block 12 looks like a pentagon like a home base in which a rectangle and a triangle are combined, the first apex 12P1 corresponds to the apex of the triangle which is protruded from the rectangle.

The second block 12 has a first outer edge 12E1 and a second outer edge 12E2 which serve as a side opposed to the first apex 12P1. The first outer edge 12E1 and the second outer edge 12E2 can be arranged in a straight line, but as shown in FIG. 4B, but they can be arranged slightly offset at the slit 12S which is described later.

In addition to the first outer edge 12E1 as described above, the second block 12 includes a third outer edge 12E3 and a fourth outer edge 12E4, which serve as outer edges to be protruded from the first block 11, so as to form a boundary with the first block 11.

The first outer edge 12E1 of the second block 12 is extended from the seventh apex 11P7 of the first block 11 to the outside of the tire radial direction in an inclined manner toward the first circumferential direction C1. The first outer edge 12E1 of the second block 12 is substantially parallel to the fourth outer edge 11E4 of the first block 11.

The third outer edge 12E3 of the second block 12 extends from the second apex 12P2, that is an end of the first outer edge 12E1 in the first circumferential direction C1, to the first circumferential direction C1 in an inclined manner toward the inside of the tire radial direction. The angle formed by the first outer edge 12E1 and the third outer edge 12E3 is substantially a right angle. The third outer edge 12E3 of the second block 12 is substantially parallel to the third outer edge 11E3 of the first block 11.

The fourth outer edge 12E4 of the second block 12 extends from the third apex 12P3, that is the inner end of the third outer edge 12E3 in the tire radial direction, to the second circumferential direction C2 in an inclined manner toward the inside of the tire radial direction.

Here, the third outer edge 12E3 and the fourth outer edge 12E4 form a second corner portion 12Q. The second corner portion 12Q is arranged at an end point of the second block 12 toward the second circumferential direction C1. The second corner portion 12Q is formed so as to rise from the first block 11. The second corner portion 12Q has a shape that tapers toward the first circumferential direction C1 in a plan view. The second corner portion 12Q is a corner portion having an intersection of the third outer edge 12E3 and the fourth outer edge 12E4, where the third apex 12P3 is formed as an apex. The angle α2 of the second corner portion 12Q, or the angle α2 formed between the third outer edge 12E3 and the fourth outer edge 12E4 can be an obtuse angle as shown in FIG. 4B, or an acute angle. The first corner portion 11Q of the first block 11 and the second corner portion 12Q of the second block 12 are arranged adjacent to each other in the tire circumferential direction. It is preferable that at least one of the angle α1 of the first corner portion 11Q and the angle α2 of the second corner portion 12Q is an acute angle so as to be raised from the surrounding. As a result, an effect of squeezing and discharging the mud and the like on rough roads can be enhanced In addition to the second outer edge 12E2 as described above, the second block 12 includes a fifth outer edge 12E5, which serve as an outer edge to be protruded from the third block 13, so as to form a boundary with the third block 13.

Along with the first outer edge 12E1, the second outer edge 12E2 of the second block 12 is formed as a side opposed to the first apex 12P1. The second outer edge 12E2 is substantially parallel to the first outer edge 12E1.

The fifth outer edge 12E5 of the second block 12 extends from the fourth apex 12P4, that is an end of the second outer edge 12E2 in the second circumferential direction C2, to the first circumferential direction C1 in an inclined manner toward the inside of the tire radial direction. The angle formed by the second outer edge 12E2 and the fifth outer edge 12E5 is substantially a right angle. The fifth outer edge 12E5 is substantially parallel to the third outer edge 12E3.

The second block 12 has a sixth outer edge 12E6 and a seventh outer edge 12E7 as outer edges that are protruded from the tire surface 5 to form a boundary with the tire surface 5.

The sixth outer edge 12E6 of the second block 12 is formed as an outer edge which is continued from the fourth outer edge 12E4. The outer edges formed by the fourth outer edge 12E4 and the sixth outer edge 12E6 connect the first apex 12P1 to the third apex 12P3.

The seventh outer edge 12E7 of the second block 12 connects the first apex 12P1 to the fifth apex 12P5, that is the inner end of the fifth outer edge 12E5 in the tire radial direction. The seventh outer edge 12E7 of the second block 12 extends in the tire circumferential direction. The seventh outer edge 12E7 of the second block 12 serves as an outer edge of the side block group 10 at the inside of the tire radial direction thereof.

As described above, the second block 12 looks like substantially a pentagon in a plan view, and the first apex 12P1 of the substantially pentagon is arranged toward the inside of the tire radial direction. In addition, the second block 12 is formed with a slit 12S extending inward in the tire radial direction from the outer edges opposed to the first apex 12P1. In the present embodiment, the slit 12S is formed toward the inside of the tire radial direction in an inclined manner toward the first circumferential direction C1. The slit 12S is extended from the vicinity of the center of the outer edges opposed to the first apex 12P1, or from a portion between the first outer edge 12E1 and the second outer edge 12E2, to the first circumferential direction C1 in an inclined manner toward the inside of the tire radial direction.

The slit 12S has a first wall at the side of the first circumferential direction C1, a second wall at the side of the second circumferential direction C2, and a third wall at the inside of the tire radial direction. The eighth outer edge 12E8, serving as an upper part of the first wall at the side of the first circumferential direction C1, is formed substantially in line with the seventh outer edge 11E7 of the first block 11 in a plan view. The ninth outer edge 12E9, serving as an upper part of the second wall at the side of the second circumferential direction C2, is formed substantially in line, in a plan view, with the first outer edge 13E1 of the third block 13 described later. The tenth outer edge 12E10, serving as the third wall at the inside of the tire radial direction, is formed near the center of the second block 12. When the slit 12S is viewed from the outside of the tire width direction, a surface having the same height as the tire surface 5 is narrowly exposed.

Next, the shape of the third block 13 is described with reference to FIG. 4C. As described before, the third block 13 is continuous with the second block 12 in the tire circumferential direction C and is provided to rise at a raised height H3 which is different from that of the second block 12. In the present embodiment, the raised height H3 of the third block 13 is lower than the raised height H2 of the second block 12. Also, the raised height H3 of the third block 13 is lower than the raised height H4 of the fourth block 14.

The third block 13 has a first outer edge 13E1 to a tenth outer edge 13E10 as outer edges that are protruded from the tire surface 5 to serve as a boundary with the tire surface 5.

The first outer edge 13E1 of the third block 13 is formed substantially in line, in a plan view, with the ninth outer edge 12E9 of the second block 12 to define an edge of the slit 12S. The first outer edge 13E1 of the third block 13 is substantially parallel to the seventh outer edge 11E7 of the first block 11.

The second outer edge 13E2 of the third block 13 is formed substantially in line, in a plan view, with the seventh outer edge 12E7 of the second block 12. The second outer edge 13E2 of the third block 13 is substantially parallel to the seventh outer edge 12E7 of the second block 12.

The third outer edge 13E3 of the third block 13 extends from the first apex 13P1, that is an end of the second outer edge 13E2 in the second circumferential direction C2, to the second circumferential direction C2 in an inclined manner toward the outside of the tire radial direction. The third outer edge 13E3 of the third block 13 is substantially parallel to the fifth outer edge 12E5 of the second block 12.

The fourth outer edge 13E4 of the third block 13 extends from the second apex 13P2, that is an end of the third outer edge 13E3 in the second circumferential direction C2, to the second circumferential direction C2 in an inclined manner toward the inside of the tire radial direction. The angle formed by the third outer edge 13E3 and the fourth outer edge 13E4 is substantially a right angle. The fourth outer edge 13E4 of the third block 13 is substantially parallel to the second outer edge 12E2 of the second block 12.

The fifth outer edge 13E5 of the third block 13 extends from the third apex 13P3, that is an end of the fourth outer edge 13E4 in the second circumferential direction C2, to the second circumferential direction C2 in an inclined manner toward the outside of the tire radial direction. The angle formed by the fourth outer edge 13E4 and the fifth outer edge 13E5 is substantially a right angle. The fifth outer edge 13E5 of the third block 13 is substantially parallel to the third outer edge 13E3 of the third block 13.

The sixth outer edge 13E6 of the third block 13 extends from the fourth apex 13P4, that is an end of the fifth outer edge 13E5 in the second circumferential direction C2, to the second circumferential direction C2 in an inclined manner toward the inside of the tire radial direction. The angle formed by the fifth outer edge 13E5 and the sixth outer edge 13E6 is substantially a right angle. The sixth outer edge 13E6 of the third block 13 is substantially parallel to the fourth outer edge 13E4 of the third block 13.

The seventh outer edge 13E7 of the third block 13 extends from the fifth apex 13P5, that is an end of the sixth outer edge 13E6 in the second circumferential direction C2, to the second circumferential direction C2. As shown in FIG. 4C, the angle formed by the seventh outer edge 13E7 and the tire circumferential direction C is smaller than the angle formed by the sixth outer edge 13E6 and the tire circumferential direction C. The direction in which the seventh outer edge 13E7 extends can substantially correspond to the second circumferential direction C2, but it can be slightly inclined to the inside of the tire radial direction as shown in FIG. 4C. The seventh outer edge 13E7 of the third block 13 is substantially parallel to the fifth outer edge 11E5 of the first block 11.

The eighth outer edge 13E8 of the third block 13 extends from the sixth apex 13P6, that is an end point of the seventh outer edge 13E7 in the second circumferential direction C2, to the outside of the tire radial direction. The eighth outer edge 13E8 of the third block 13 is substantially parallel to the sixth outer edge 12E6 of the second block 12.

The ninth outer edge 13E9 of the third block 13 extends from the seventh apex 13P7, which is the outside end of the eighth outer edge 13E8 in the tire radial direction, to the first circumferential direction C1. The ninth outer edge 13E9 of the third block 13 is substantially parallel to the seventh outer edge 13E7 of the third block 13. The seventh outer edge 13E7 of the third block 13 is substantially parallel to the fifth outer edge 11E5 of the first block 11. Also, the ninth outer edge 13E9 of the third block 13 is substantially parallel to the fifth outer edge 11E5 of the first block 11.

The tenth outer edge 13E10 of the third block 13 extends from the eighth apex 13P8, that is an end of the ninth outer edge 13E9 in the first circumferential direction C1, to the first circumferential direction C1 in an inclined manner toward the outside of the tire radial direction. The tenth outer edge 13E10 of the third block 13 is substantially parallel to the sixth outer edge 13E6 of the third block 13. That is, the tenth outer edge 13E10 of the third block 13 is substantially parallel to the fourth outer edge 11E4 of the first block 11.

The third block 13 further has a boundary with the above-mentioned second block 12 and a boundary with the fourth block 14 described later.

The third block 13 has a rib 13R extending toward the adjacent side block group in the tire circumferential direction. The rib 13R is formed so as to be projected from the tire surface 5. The outer edges of the rib 13R correspond to the sixth outer edge 13E6, the seventh outer edge 13E7, the eighth outer edge 13E8, the ninth outer edge 13E9 and the tenth outer edge 13E10, as described above. The rib 13R is arranged at an end point of the third block 13 toward the second circumferential direction C2. When viewed in the tire radial direction along the arrow RD1 shown in FIG. 4C, the rib 13R extends in the tire circumferential direction so as to overlap at least a part of the first block 11 of the adjacent side block group. As a result, high cut resistance can be obtained.

The rib 13R is bent near the tip thereof. The ribs 13R includes: a first portion 13R1 of the rib 13R which is defined by the sixth outer edge 13E6 and the tenth outer edge 13E10 of the third block 13; and a second portion 13R2 of the rib 13R which is defined by the seventh outer edge 13E7, the eighth outer edge 13E8 and the ninth outer edge 13E9 of the third block 13. Also, the angle formed between the extension direction of the second portion 13R2 of the rib 13R and the tire circumferential direction C is smaller than the angle formed between the extension direction of the first portion 13R1 of the rib 13R and the tire circumferential direction C. That is, the vicinity of the tip of the rib 13R is bent at the bending points defined by the fifth apex 13P5 and the eighth apex 13P8 to extend to a direction close to the tire circumferential direction C.

Here, the tip of the rib 13R is formed by the eighth outer edge 13E8. The outer edges of the rib 13R at the outside of the tire radial direction correspond to the ninth outer edge 13E9 and the tenth outer edge 13E10. The outer edges of the rib 13R at the inside of the tire radial direction correspond to the sixth outer edge 13E6 and the seventh outer edge 13E7.

In addition, the outer edges of the rib 13R at the outside of the tire radial direction, i.e., 13E9 and 13E10m, are arranged to be opposed to the first block 11 of the adjacent side block group via a gap. The tip 13E8 of the rib 13R is arranged to be opposed to the second block 12 of the adjacent side block group with a gap.

For example, the third block 13 constituting the first side block group 10A has a rib 13R which extends to the direction toward the second side block group 10B. The outer edges of the rib 13R of the first side block group 10A at the outside of the tire radial direction, i.e., 13E9 and 13E10m, are arranged so as to be opposed to the first block 11 of the second side block group 10B via a gap; and the tip, i.e., 13E8, of the rib 13R of the first side block group 10A is arranged so as to be opposed to the second block 12 of the second side block group 10B via a gap. As a result, high cut resistance can be obtained while ensuring the discharge of mud and the like on rough roads.

Next, the shape of the fourth block 14 is described with reference to FIG. 4D. As described above, the fourth block 14 is continuous with the third block 13 in the tire circumferential direction C and is provided to rise at a raised height H4 which is different from that of the third block 13. In the present embodiment, the raised height H4 of the fourth block 14 is higher than the raised height H3 of the third block 13.

The fourth block 14 is substantially a pentagon in a plan view. More specifically, the fourth block 14 has a shape in which the base of a triangle is connected to one side of a rectangle, so as to look like substantially a pentagon like a so-called home base.

The fourth block 14 has a first apex 14P1 at the outside of the tire radial direction. When the fourth block 14 is a pentagon like a home base in which a rectangle and a triangle are combined, the first apex 14P1 corresponds to the apex of the triangle which is protruded from the rectangle.

The fourth block 14 has a first outer edge 14E1 and a second outer edge 14E2 which serve as sides opposed to the first apex 14P1. The first outer edge 14E1 and the second outer edge 14E2 can be arranged in a straight line, but as shown in FIG. 4D, they can be arranged slightly offset from the slit 14S described later.

In addition to the above-mentioned first outer edge 14E1 and second outer edge 14E2, the fourth block 14 includes a third outer edge 14E3, which serve as an outer edge to be protruded from the third block 13, so as to form a boundary with the third block 13.

The first outer edge 14E1 and the second outer edge 14E2 of the fourth block 14 are substantially parallel to the second outer edge 12E2 of the second block 12. Also, the first outer edge 14E1 and the second outer edge 14E2 of the fourth block 14 are substantially parallel to the fourth outer edge 13E4 of the third block 13.

The third outer edge 14E3 of the fourth block 14 extends from the second apex 14P2, that is an end of the second outer edge 14E2 in the second circumferential direction C2, to the second circumferential direction C2 in an inclined manner toward the outside of the tire radial direction. The angle formed between the second outer edge 14E2 and the third outer edge 14E3 is substantially a right angle. The third outer edge 14E3 of the fourth block 14 is substantially parallel to the fifth outer edge 13E5 of the third block 13.

The fourth block 14 has a fourth outer edge 14E4 to a sixth outer edge 14E6 as outer edges that are protruded from the tire surface 5 to serve as a boundary with the tire surface 5.

The fourth outer edge 14E4 of the fourth block 14 is an outer edge which is formed continuously from the third outer edge 14E3. The outer edge formed by the fourth outer edge 14E4 connects the second apex 14P2 to the third apex 14P3 which is an outside end of the fourth outer edge 14E4 in the tire radial direction thereof. The fourth outer edge 14E4 of the fourth block 14 is substantially parallel to the third outer edge 11E3 of the first block 11.

The fifth outer edge 14E5 of the fourth block 14 connects the first apex 14P1 to the third apex 14P3. The fifth outer edge 14E5 of the fourth block 14 extends in the tire radial direction. The fifth outer edge 14E5 of the fourth block 14 is substantially parallel to the second outer edge 11E2 of the first block 11.

The sixth outer edge 14E6 of the fourth block 14 extends from the fourth apex 14P4, that is an end of the first outer edge 14E1 in the first circumferential direction C1, to the second circumferential direction C2 in an inclined manner toward the outside of the tire radial direction. The sixth outer edge 14E6 of the fourth block 14 is formed substantially in line, in a plan view, with the first outer edge 13E1 of the third block 13.
The sixth outer edge 14E6 of the fourth block 14 is substantially parallel to the first outer edge 13E1 of the third block 13.

The fourth block 14 has a seventh outer edge 14E7 as an outer edge at the outside of the tire radial direction thereof. The seventh outer edge 14E7 extends in the tire circumferential direction. The seventh outer edge 14E7 connects the first apex 14P1 to the fifth apex 14P5, that is the outside end of the sixth outer edge 14E6 in the tire radial direction. The seventh outer edge 14E7 serves as a boundary with the ridge 60 arranged at the outside of the tire radial direction of the fourth block 14. In the present embodiment, the seventh outer edge 14E7 is connected to the ridge 60. The seventh outer edge 14E7 of the fourth block 14, along with the first outer edge 11E1 of the first block 11, serve as an outer edge of the side block group 10 at the outside of the tire radial direction.

As described above, the fourth block 14 looks like substantially a pentagon in a plan view, and the first apex 14P1 of the substantially pentagon is arranged toward the outside of the tire radial direction. In addition, the fourth block 14 is provided with a slit 14S extending outward in the tire radial direction from the outer edge opposed to the first apex 14P1. In the present embodiment, the slit 14S is formed toward the outside of the tire radial direction in an inclined manner toward the second circumferential direction C2. The slit 14S is extended from the vicinity of the center of the outer edge opposed to the first apex 14P1, or from a portion between the first outer edge 14E1 and the second outer edge 14E2, to the second circumferential direction C2 in an inclined manner toward the outside of the tire radial direction.

The slit 14S has a first wall at the side of the first circumferential direction C1, a second wall at the side of the second circumferential direction C2, and a third wall at the outside of the tire radial direction. The eighth outer edge 14E8, serving as an upper part of the first wall at the side of the first circumferential direction C1, is formed substantially in line, in a plan view, with the fifth outer edge 12E5 of the second block 12. The ninth outer edge 14E9, serving as an upper part of the second wall at the side of the second circumferential direction C2, is formed substantially in line, in a plan view, with the third outer edge 13E3 of the third block 13. The tenth outer edge 14E10, serving as the third wall at the outside of the tire radial direction, is formed near the center of the fourth block 14. When the slit 14S is viewed from the inside of the tire width direction, the surface of the third block 13 having a raised height H3 is narrowly exposed. As shown in FIG. 4D, a hypothetical line L extended along the second slit 14S of the first side block group is substantially parallel to an outer edge 12E5 of the second block of the first side block group.

Figure 4A:
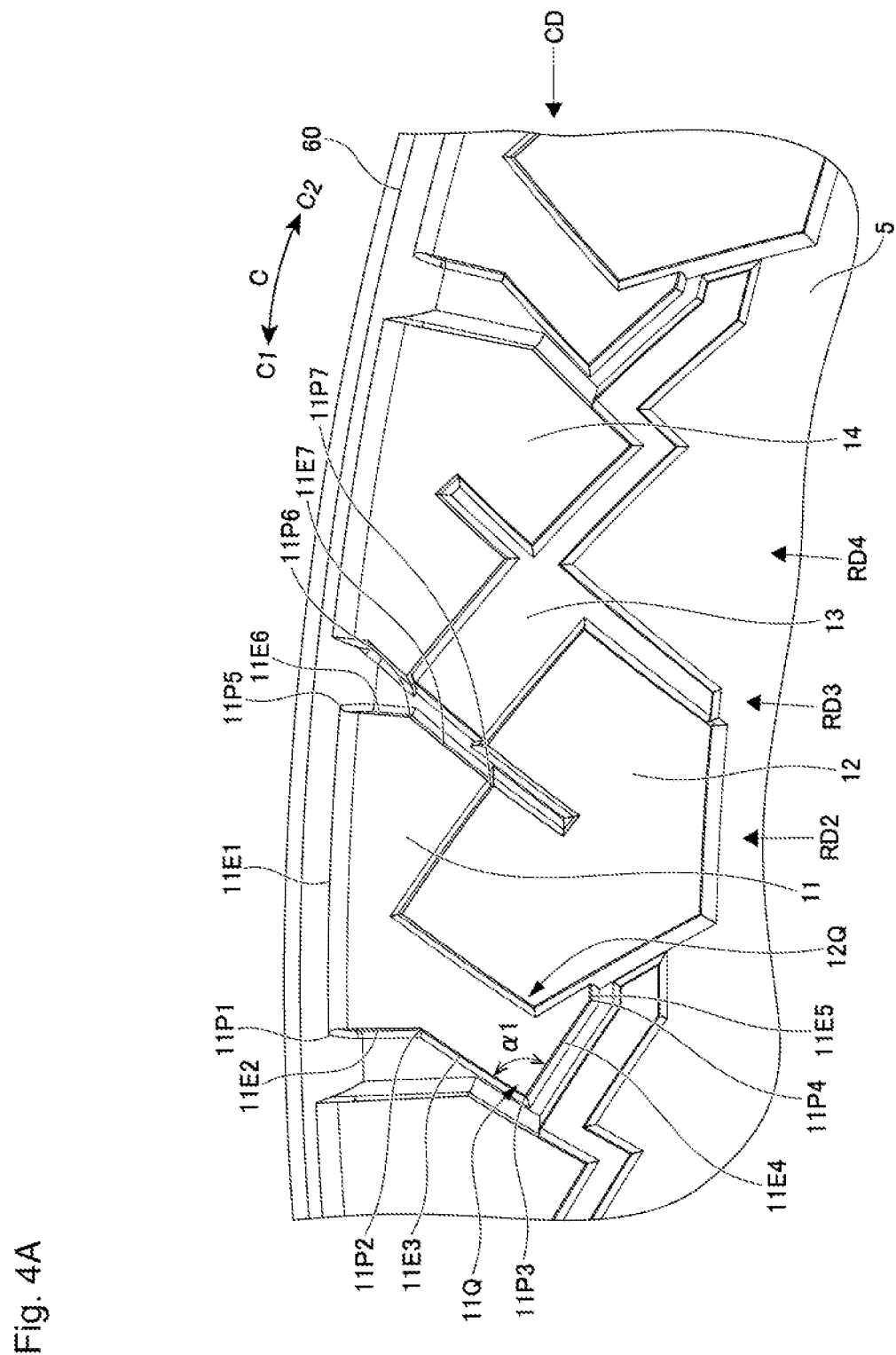
FIG. 4A is an enlarged view for explaining the first block of the embodiment of FIG. 1.
Figure 4B:
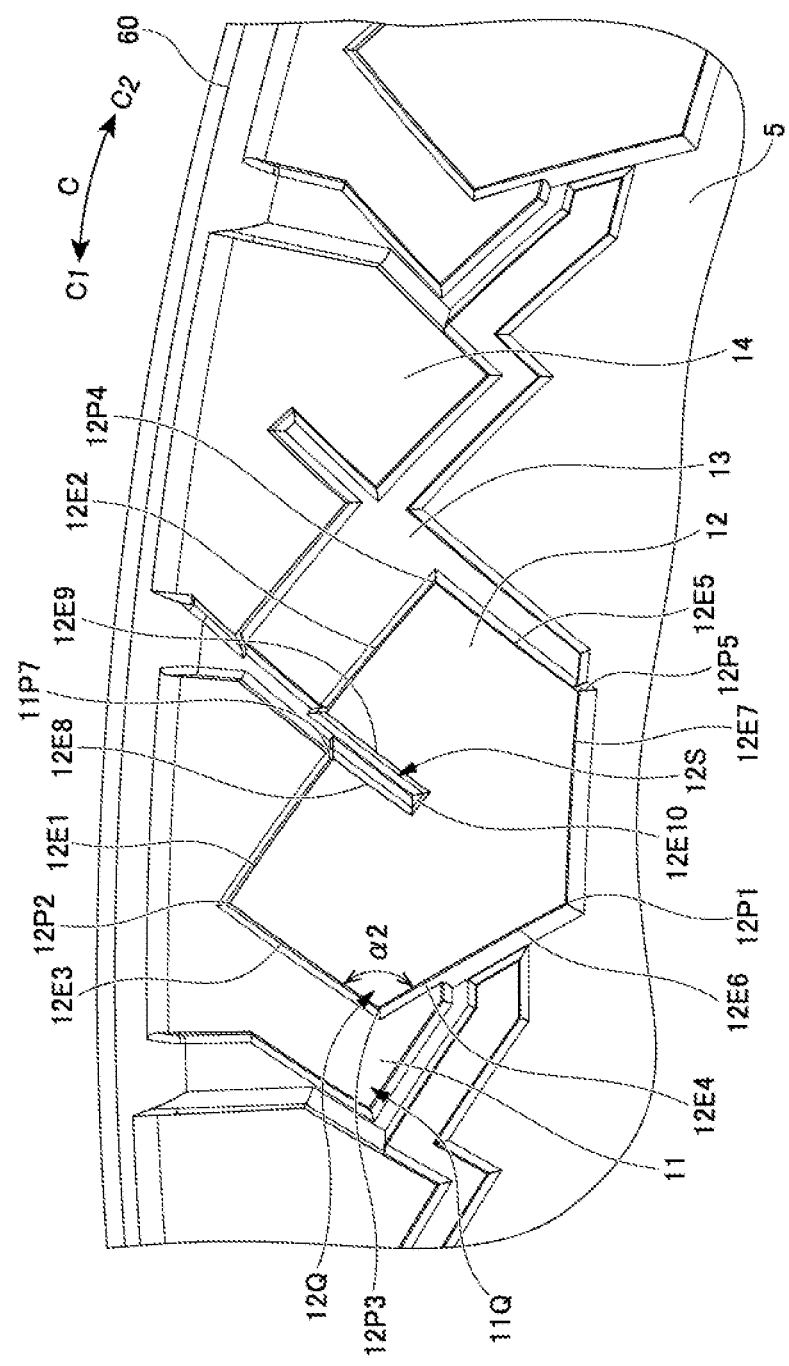
FIG. 4B is an enlarged view for explaining the second block of the embodiment of FIG. 1.
Figure 4C:
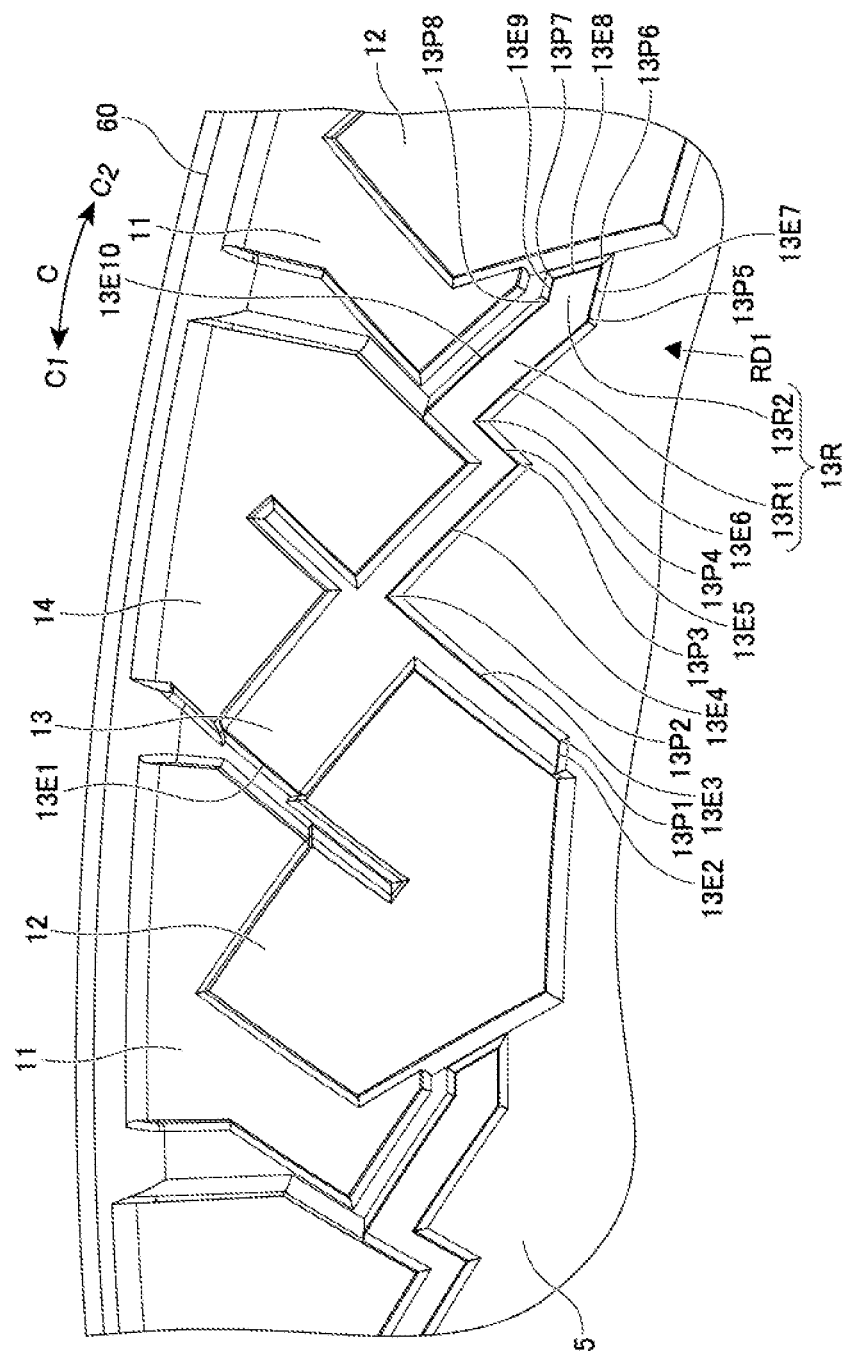
FIG. 4C is an enlarged view for explaining the third block of the embodiment of FIG. 1.

Next, FIG. 4E along with FIG. 2, FIG. 3 and FIG. 4A to FIG. 4D are used to describe the grooves formed in the side block 6. As shown in FIG. 2 and FIG. 3, the side block 6 is provided with grooves 32 which divide the plurality of the side block groups 10. Also, the side block group 10 is provided with grooves 31 that divides the first block 11 from the third block 13, as well as divides the first block 11 from the fourth block 14.

First, the groove 31 which is formed in the side block group 10 that divides the first block 11 from the third block 13, as well as divides the first block 11 from the fourth block 14 is described. As shown in FIG. 4E, the groove 31 includes a first portion 31A and a second portion 31B.

The first portion 31A is formed by being surrounded by a wall whose upper edge is the sixth outer edge 11E6 of the first block 11, and a wall whose upper edge is the sixth outer edge 14E6 of the fourth block 14. The groove width of the first portion 31A gradually decreases toward the inside of the tire radial direction.

The second portion 31B is formed so as to be continued from the first portion 31A. The second portion 31B is formed by being surrounded by a wall whose upper edge is the seventh outer edge 11E7 of the first block 11, and a wall whose upper edge is the first outer edge 13E1 of the third block 13. The groove width of the second portion 31B is substantially constant.

The groove 31 formed by the first portion 31A and the second portion 31B extends in the tire radial direction to divide the first block 11 from the third block 13 and the fourth block 14. In the present embodiment, the groove 31 extends from the ridge 60 to the first circumferential direction C1 in an inclined manner toward the inside of the tire radial direction. Then, the groove 31 reaches the slit 12S formed in the second block 12. The slit 12S extends in the tire radial direction so as to be continued from the groove 31. In the present embodiment, the slit 12S is formed toward the inside of the tire radial direction in an inclined manner toward the first circumferential direction C1. As a result, the substantially linear groove 31 and the slit 12S are formed to extend from the outside end of the tire radial direction of the side block group 10 to the vicinity of the center of the second block 12. Appropriately forming the unevenness in this way, it is possible to improve the cut resistance of the side surface of the tire while ensuring the traction performance on the side surface of the tire. Also, it is possible to improve the traction performance at the side surface of the tire. In addition, heat dissipation is improved, and heat storage inside the rubber can be suppressed.

Figure 5:
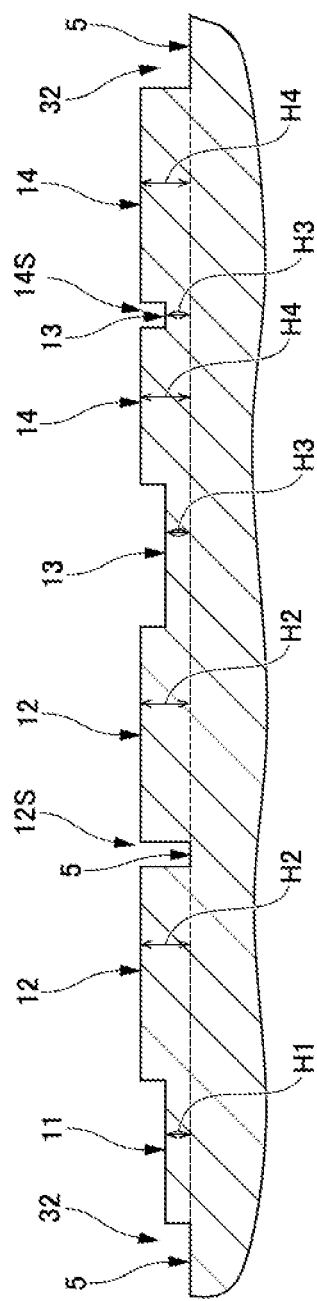
FIG. 5 is a cross sectional view schematically showing a V-V section of FIG. 3.

As shown in FIG. 2, FIG. 3 and FIG. 5, the first portion 31A of the groove 31 at the outside end of the tire radial direction has a tire circumferential position which can coincide with the tire circumferential position of the shoulder groove 55. Also, the groove width of the groove 31 of the first portion 31A at the outside end of the tire radial direction can be substantially the same as the groove width of the shoulder groove 55 at the inside end of the tire radial direction.

The bottom portion (exposed surface) of the groove 31 and the slit 12S has the same height as the tire surface 5.

Next, the groove 32 which divides one side block group 10 from the adjacent side block group 10 is described. As shown in FIG. 4E, the groove 32 has a first portion 32A, a second portion 32B, a third portion 32C, a fourth portion 32D, and a fifth portion 32E. The first part 32A to the fifth part 32E are connected.

The first portion 32A is surrounded by a wall whose upper edge is the fifth outer edge 14E5 of the fourth block 14, and a wall whose upper edge is the second outer edge 11E2 of the first block 11 of the adjacent side block group 10. The first portion 32A extends from the ridge 60 toward the inside of the tire radial direction. The groove width of the first portion 32A at the outside end of the tire radial direction is wider than the groove width at the other portions of the groove 32.

The second portion 32B is surrounded by a wall whose upper edge is the fourth outer edge 14E4 of the fourth block 14, and a wall whose upper edge is the third outer edge 11E3 of the first block 11 of the adjacent side block group 10. The second portion 32B extends to the first circumferential direction C1 in an inclined manner toward the inside of the tire radial direction. The groove width of the second portion 32B at the inside end of the tire radial direction is narrower than the groove width of the first portion 32A at the outside end of the tire radial direction.

The third portion 32C is surrounded by a wall whose upper edge is the tenth outer edge 13E10 of the third block 13, and a wall whose upper edge is the fourth outer edge 11E4 of the first block 11 of the adjacent side block group 10. The third portion 32C extends to the second circumferential direction C2 in an inclined manner toward the inside of the tire radial direction. The angle formed between the extending direction of the second portion 32B and the extending direction of the third portion 32C is substantially a right angle. The groove width of the third portion 32C at the inside end of the tire radial direction is substantially constant through the third portion 32C and is narrower than the groove width of the first portion 32A at the outside end of the tire radial direction.

The fourth portion 32D is surrounded by a wall whose upper edge is the ninth outer edge 13E9 of the third block 13, and a wall whose upper edge is the fifth outer edge 11E5 of the first block 11 of the adjacent side block group 10. The fourth portion 32D extends toward the second circumferential direction C2. The groove width of the fourth portion 32D at the inside end of the tire radial direction is substantially equal to the groove width of the third portion 32C.

The fifth portion 32E is surrounded by a wall whose upper edge is the eighth outer edge 13E8 of the third block 13, and a wall whose upper edge is the sixth outer edge 12E6 of the second block 12 of the adjacent side block group 10. The fifth portion 32E extends toward the inside of the tire radial direction. The groove width of the fourth portion 32D at the inside end of the tire radial direction is narrower than the groove width of the first portion 32A at the outside end of the tire radial direction.

The groove 32 made by the first portion 32A to the fifth portion 32E divides one side block group 10 from the adjacent side block group 10. For example, the groove 32 divides the first side block group 10A from the second side block group 10B. The groove 32 has a plurality of bent portions while dividing the plurality of side block groups 10.

As a result, high cut resistance can be obtained while ensuring the discharge of mud and the like on rough roads. Also, appropriately forming the unevenness, it is possible to improve the traction performance on the side surface of the tire. In addition, heat dissipation is improved, and heat storage inside the rubber can be suppressed.

As shown in FIG. 2, FIG. 3 and FIG. 5, the first portion 32A of the groove 32 at the outside end of the tire radial direction has a tire circumferential position which can coincide with the tire circumferential position of the shoulder groove 55. Also, the groove width of the groove 32 of the first portion 32A at the outside end of the tire radial direction can be substantially the same as the groove width of the shoulder groove 55 at the inside end of the tire radial direction.

The bottom portion (exposed surface) of the groove 32 has the same height as the tire surface 5.

The first block 11 and the second block 12 are aligned in the tire circumferential direction, such that the first block 11 overlaps at least a part of the second block 12 when viewed in the tire circumferential direction along the arrow CD, and that the first block 11 overlaps at least a part of the second block 12 when viewed in the tire radial direction along the arrow RD2. Also, the second block 12 and the third block 13 are aligned in the tire circumferential direction, such that the second block 12 overlaps at least a part of the third block 13 when viewed in the tire circumferential direction along the arrow CD, and that the second block 12 overlaps at least a part of the third block 13 when viewed in the tire radial direction along the arrow RD3. The third block 13 and the fourth block 14 are aligned in the tire circumferential direction, such that the third block 13 overlaps at least a part of the fourth block 14 when viewed in the tire circumferential direction along the arrow CD, and that the third block 13 overlaps at least a part of the fourth block 14 when viewed in the tire radial direction along the arrow RD4. As a result, high cut resistance can be obtained.

Figure 6:
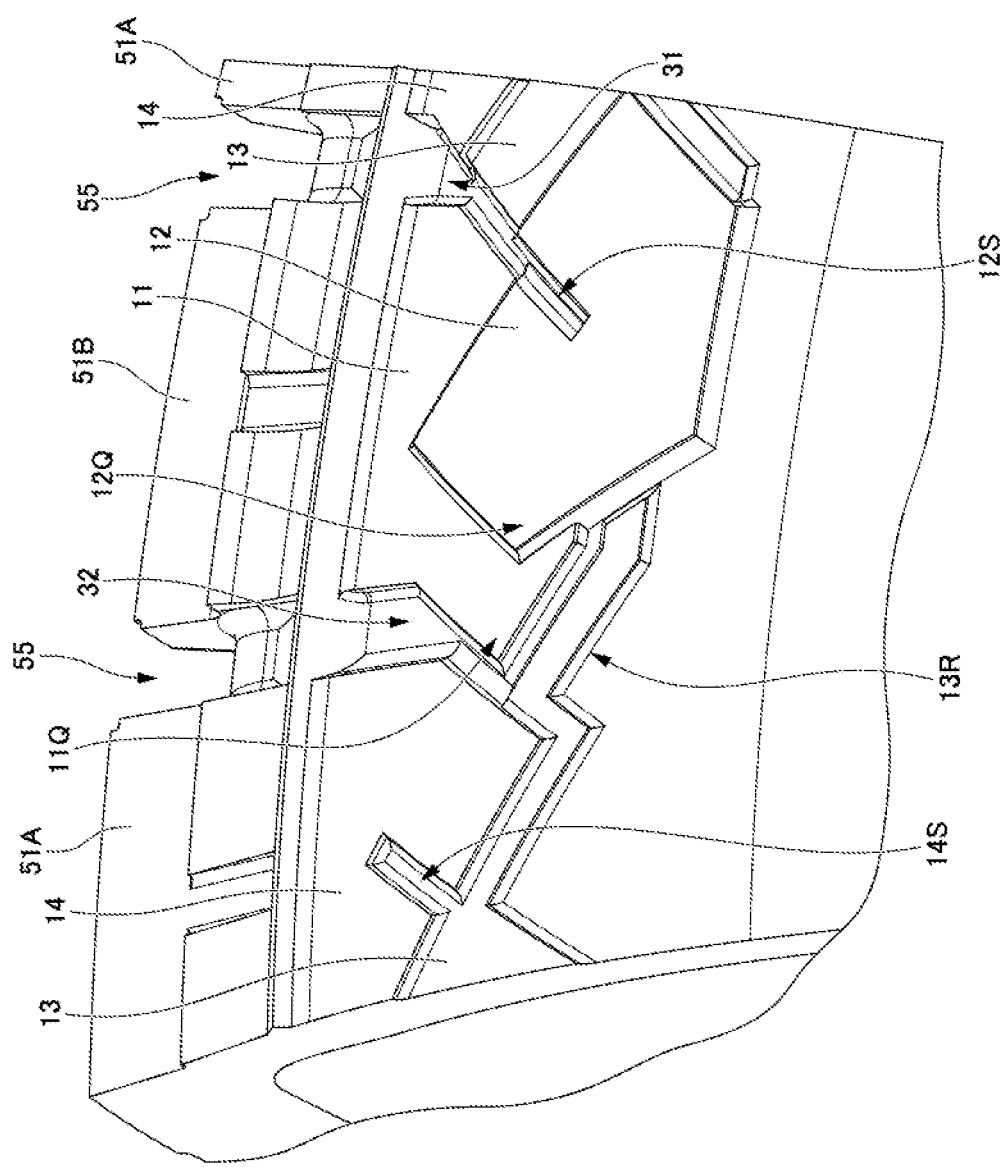
FIG. 6 is an enlarged perspective view seeing the VI part of FIG. 3 in a diagonal direction.

Next, the relationship among the raised heights of the first block 11 to the fourth block 14, constituting the side block group 10 in the present embodiment, is described with reference to FIG. 5 and FIG. 6. FIG. 5 is a cross sectional view schematically showing a V-V section of FIG. 3. FIG. 5 is a schematic cross-sectional view for explaining the relationship of the raised heights, while omitting the details such as a chamfer shape. FIG. 6 is an enlarged perspective view viewing the VI part of FIG. 3 in a diagonal direction, three-dimensionally showing a relationship among the raised heights of the first block 11 to the fourth block 14. FIG. 6 is a view of the side block 6 looked up slightly diagonally from a position at the outside of the tire width direction and at the inside of the tire radial direction in order to make it easier to grasp the three-dimensional relationship between the raised heights.

As shown in FIG. 5, the first block 11 is raised from the tire surface 5 of the sidewall 3 at a raised height H1. The second block 12 is raised from the tire surface 5 at a raised height H2 which is different from that of the first block 11. The third block 13 is raised from the tire surface 5 at a raised height H3 which is different from that of the second block 12. The fourth block 14 is raised from the tire surface 5 at a raised height H4 which is different from that of the third block 13. In the present embodiment, the raised height H1 from the tire surface 5 of the first block 11 and the raised height H3 from the tire surface 5 of the third block 13 are lower than the raised height H2 from the tire surface 5 of the second block 12 and the raised height H4 from the tire surface 5 of the fourth block 14. For example, the raised height H1 and the raised height H3 can be substantially the same. Also, the raised height H2 and the raised height H4 can be substantially the same.

As shown in the cross-sectional view of FIG. 5, the bottom surface (exposed surface) of a portion of the second block 12 where the slit 12S is formed has the same height as the tire surface 5. Also, the bottom surface (exposed surface) of a portion of the fourth block 14 where the slit 14S is formed has the same height as the surface of the third block 13, that is, the raised height H3.

By making the raised heights of the adjacent blocks different in this way, the area of the blocks raised from the tire surface 5 can be secured widely, and the unevenness can be appropriately formed, so that the traction performance on the side surface of the tire can be ensured while the cut resistance of the side surface of the tire can be improved at the same time. In addition, since the unevenness can be appropriately formed, it is possible to improve the discharge property of mud and the like on rough roads. In addition, heat dissipation is improved, and heat storage inside the rubber can be suppressed.

For example, the raised height H1 is preferably 0.5 mm or more and 2 mm or less. The raised height H2 is preferably higher than the raised height H1 and preferably 1.5 mm or more and 4 mm or less. The difference between raised height H1 and the raised height H2 is preferably 0.5 mm or more. The raised height H3 is preferably lower than the raised height H2 and is preferably 0.5 mm or more and 2 mm or less. The difference between raised height H2 and the raised height H3 is preferably 0.5 mm or more. The raised height H4 is preferably higher than the raised height H3 and preferably 1.5 mm or more and 4 mm or less. The difference between raised height H3 and the raised height H4 is preferably 0.5 mm or more. For example, the raised height H1 is preferably 25% or more and 75% or less of the raised height H2. The raised height H3 is preferably 25% or more and 75% or less of the raised height H2 and is preferably 25% or more and 75% or less of the raised height H4. As a result, the above-mentioned effects can be obtained. However, the relationship among the raised heights H1 to H4 is not limited to the configurations specifically mentioned above. For example, the raised height H1, the raised height H2, the raised height H3, and the raised height H4 can be increased in this order. In such a configuration as well, it is possible to improve the cut resistance of the side surface of the tire while ensuring the traction performance on the side surface of the tire. Also, it is possible to improve the discharge property of mud and the like on rough roads.

In addition, the side blocks 6 of the present embodiment can be arranged on both sidewalls 3 but can be arranged on at least one of the side walls 3.

The term "side surface" of the tire in this specification means a surface of the tire excluding the side blocks.

The term "substantially a right angle" preferably means an angle of 85 to 95 degrees, more preferably 87 to 92 degrees, and yet more preferably 88 to 91 degrees.

The term "substantially parallel," "substantially corresponds to", or "substantially in line" preferably means an angle of −5 to +5 degrees, more preferably −2 to +2 degrees, and yet more preferably −1 to +1 degree.

According to the tire 1 of the present embodiment, the following effects are obtained.

(1) The tire of the present embodiment includes a side block 6 provided on the side surface of the tire, and the side block 6 including: a first block 11 on the tire surface 5, the first block protruded from the tire surface; a second block 12 on the tire surface, the second block protruded from the tire surface by a raised height different from that of the first block, the second block formed to be continued from the first block in a circumferential direction of the tire; a third block 13 on the tire surface, the third block protruded from the tire surface by a raised height different from that of the second height, the third block formed to be continued from the second block in the circumferential direction of the tire; and a fourth block 14 on the tire surface, the fourth block protruded from the tire surface by a raised height different from that of the third height, the fourth block formed to be continued from the third block in the circumferential direction of the tire. By making the raised heights of the adjacent blocks different in this way, the area of the blocks raised from the tire surface 5 can be secured widely, and the unevenness can be appropriately formed, so that the traction performance on the side surface of the tire can be ensured while the cut resistance of the side surface of the tire can be improved at the same time. In addition, since the unevenness can be appropriately formed, it is possible to improve the discharge property of mud and the like on rough roads. In addition, heat dissipation is improved, and heat storage inside the rubber can be suppressed.

(2) The side block 6 of the tire 1 according to the present embodiment is composed of a plurality of side block groups 10, and each of the plurality of side block groups 10 includes the first block 11, the second block 12, the third block 13 and a fourth block 14. The plurality of side block groups 10 are arranged at intervals in the tire circumferential direction. As a result, it is possible to improve the cut resistance of the side surface of the tire while ensuring the traction performance on the side surface of the tire. In addition, since a plurality of side block groups 10 are arranged at intervals, it is possible to improve the discharge property of mud and the like on rough roads.

In addition, heat dissipation is improved, and heat storage inside the rubber can be suppressed.

(3) The third block 13 of the tire 1 according to the present embodiment includes a ribs 13R extending toward the adjacent side block group in the tire circumferential direction, and the rib 13R overlaps at least a part of the first block 11 of the adjacent side block group in the tire radial direction. As a result, high cut resistance can be obtained.

(4) The rib 13R of the tire 1 according to the present embodiment has a tip, an outer edge at the outside of the tire radial direction, and an outer edge at the inside of the tire radial direction. The outer edge of the rib 13R at the outside of the tire radial direction is arranged with the first block 11 of the adjacent side block group with a gap. The tip of the rib 13R is arranged with a gap with the second block 12 of the adjacent side block group. As a result, high cut resistance can be obtained while ensuring the discharge of mud and the like on rough roads.

(5) In the tire 1 according to the present embodiment, the raised heights from the tire surface 5 of the first block 11 and the third block 13 are lower than the raised heights from the tire surface 5 of the second block 12 and the fourth block 14. As a result, it is possible to improve the cut resistance of the side surface of the tire while ensuring the traction performance on the side surface of the tire. In addition, since the unevenness can be appropriately formed, it is possible to improve the discharge property of mud and the like on rough roads. In addition, heat dissipation is improved, and heat storage inside the rubber can be suppressed.

(6) In the tire 1 according to the present embodiment, the first block 11 has a first corner portion 11Q arranged on one circumferential end thereof in the tire circumferential direction, and the second block 12 has a second corner portion 12Q arranged on one circumferential end thereof in the same tire circumferential direction. The first corner portion 11Q and the second corner portion 12Q are arranged adjacent to each other in the tire circumferential direction. As a result, an effect of squeezing and discharging the mud and the like on a rough road can be enhanced.

(7) In the tire 1 according to the present embodiment, at least one of the angle of the first corner portion 11Q and the angle of the second corner portion 12Q is an acute angle so as to be raised from the surrounding. As a result, an effect of squeezing and discharging the mud and the like on a rough road can be enhanced.

(8) In the tire 1 according to the present embodiment, the first block 11 is divided from the third block 13 and the fourth block 14 by a groove 31 which extends in the tire radial direction, and the second block 12 has a slit 12S extending in the tire radial direction, which is continued from the groove 31. As a result, it is possible to improve the cut resistance of the side surface of the tire while ensuring the traction performance on the side surface of the tire.

(9) In the tire 1 according to the present embodiment, the second block 12 is substantially pentagonal in a plan view, and the apex 12P1 of the substantially pentagon is arranged toward the inside in the tire radial direction. The slit 12S extends from outer edges 12E1, 12E2, opposed to the apex 12P1, to the inside of the tire radial direction. As a result, it is possible to improve the cut resistance of the side surface of the tire while ensuring the traction performance on the side surface of the tire.

(10) In the tire 1 according to the present embodiment, the first block 11 and the second block 12 are aligned in the tire circumferential direction, such that the first block overlaps at least a part of the second block when viewed in the tire circumferential direction, and that the first block overlaps at least a part of the second block when viewed in the tire radial direction. As a result, high cut resistance can be obtained.

(11) In the tire 1 according to the present embodiment, the second block 12 and the third block 13 are aligned in the tire circumferential direction, such that the second block overlaps at least a part of the third block when viewed in the tire circumferential direction, and that the second block overlaps at least a part of the third block when viewed in the tire radial direction. As a result, high cut resistance can be obtained.

(12) In the tire 1 according to the present embodiment, the third block 13 and the fourth block 14 are aligned in the tire circumferential direction, such that the third block overlaps at least a part of the fourth block when viewed in the tire circumferential direction, and that the third block overlaps at least a part of the fourth block when viewed in the tire radial direction. As a result, high cut resistance can be obtained.

The present invention is not limited to the above embodiment, and the scope of the present invention can cover modifications and improvements to the extent that the objectives of the present invention can be achieved.

EXPLANATION OF THE REFERENCES IN THE DRAWINGS

1: Tire
2: Bead
3: Side wall
4: Tread
5: Tire surface
6: Side block
10: Side block group
10A: First side block group
10B: Second side block group
10C: Third side block group
11: First block
11Q: First corner portion
12: Second block
12Q: Second corner portion
12S: Slit
13: Third block
13R: Rib
14: Fourth block
31: Groove
32: Groove

What is claimed is:

1. A tire having a tire circumferential direction and a tire radial direction, the tire comprising a plurality of side block groups arranged on a side surface of the tire, said plurality of the side block groups comprising a first side block group comprising:
    a first block protruded from a tire surface;
    a second block protruded from the tire surface, the second block continued from the first block;
    a third block protruded from the tire surface, the third block continued from the second block; and
    a fourth block protruded from the tire surface, the fourth block continued from the third block,
    wherein the first block is aligned with the third block in the tire circumferential direction via a groove extending therebetween, the groove extending in the tire radial direction,
    wherein at least a part of the first block and at least a part of the fourth block are located at an outside in the tire radial direction with respect to the second block,
    wherein the plurality of the side block groups further comprises a second side block group arranged adjacent to the first side block group in the tire circumferential direction, the second side block group comprising a first block, a second block, a third block and a fourth block in the same configuration as those of the first side block group,
    wherein the third block of the first side block group comprises a rib extending toward the second side block group in the tire circumferential direction,
    wherein when viewed in the tire radial direction, the rib of the first side block group overlaps at least a part of the first block of the second side block group.

2. The tire according to claim 1,
    wherein the plurality of the side block groups are arranged on the side surface with a space between each other in the tire circumferential direction.

3. The tire according to claim 1,
    wherein the rib of the first side block group comprises a tip, an outer edge at an outside of a tire radial direction, and another outer edge at an inside of the tire radial direction,
    wherein said outer edge of the rib of the first side block group is opposed to the first block of the second side block group with a gap therebetween,
    wherein said tip of the rib of the first side block group is opposed to the second block of the second side block group with another gap.

4. The tire according to claim 1, wherein the first block, the second block, the third block and the fourth block are protruded from the tire surface at a first height, a second height, a third height and a fourth height, respectively,
    wherein the first height and the third height are lower than the second height and the fourth height.

5. The tire according to claim 1,
wherein the first block of the first side block group comprises a first corner portion arranged at a circumferential end thereof in a clockwise or counterclockwise tire circumferential direction, and a third corner portion;
wherein the second block of the first side block group comprises a second corner portion arranged at a second circumferential end thereof in a direction same as said clockwise or counterclockwise tire circumferential direction,
wherein the second corner portion is located between the first corner portion and the third corner portion in the clockwise or counterclockwise tire circumferential direction, and the third corner portion is located at an inside of the tire radial direction of the second corner portion.

6. The tire according to claim 5,
wherein at least one of the first corner portion and the second corner portion is an acute angle.

7. The tire according to claim 1,
wherein the first block of the first side block group is located in the tire circumferential direction of the fourth block of the first side block group, the first block of the first side block group divided from the fourth block of the first side block group via the groove extending therebetween,
wherein a first slit is formed in the second block of the first side block group to extend in the tire radial direction, the first slit continued from the groove.

8. The tire according to claim 7,
wherein the second block of the first side block group has a shape of a polygon having at least five corners, wherein the first slit extends from a middle of the second block of the first side block group toward the outside in the tire radial direction to reach the groove formed radially outside the second block of the first side block group.

9. The tire according to claim 8, wherein a bottom surface of the first slit corresponds to the side surface of the tire.

10. The tire according to claim 8, wherein a second slit is formed in the fourth block, wherein a bottom surface of the second slit corresponds to a surface of the third block.

11. The tire according to claim 10, wherein the first slit is substantially parallel to the second slit.

12. The tire according to claim 10, wherein the second slit is extended in an inclined manner with respect to the tire radial direction and the tire circumferential direction.

13. The tire according to claim 10, wherein a hypothetical line extended along the second slit of the first side block group is substantially parallel to an outer edge of the second block of the first side block group.

14. The tire according to claim 8, wherein the first slit is extended in an inclined manner with respect to the tire radial direction and the tire circumferential direction.

15. The tire according to claim 1, wherein a bottom surface of the groove corresponds to the side surface of the tire.

16. The tire according to claim 1, wherein at least a part of the third block of the first side block group is located between the second block of the first side block group and the fourth block of the first side block group in the tire radial direction.

* * * * *